United States Patent Office 3,549,599
Patented Dec. 22, 1970

3,549,599
CARBOXYLIC ACID ESTER SUBSTITUTED POLYHYDANTOINS
Rudolf Merten, Leverkusen, Germany, assignor to Farbenfabriken Bayer Aktiengesellschaft, Leverkusen, Germany, a corporation of Germany
No Drawing. Filed Feb. 19, 1968, Ser. No. 706,666
Claims priority, application Germany, Mar. 1, 1967, F 51,676
Int. Cl. C08g 22/02
U.S. Cl. 260—77.5  11 Claims

ABSTRACT OF THE DISCLOSURE

Polymeric polycarboxylic acid esters containing hydantoin or thiohydantoin rings which can be prepared by first reacting a diester of an ethenylene-1,2-dicarboxylic acid with a primary polyamine, subsequently with a polyiso(thio)cyanate and afterwards effecting ring closure of the urea or thiourea obtained.

---

This invention relates to a process for the production of polymeric polycarboxylic acid esters containing hydantoin or thiohydantoin rings in the molecule. In one embodiment of the invention, the new polycarboxylic acid esters contain repeating units of the formula

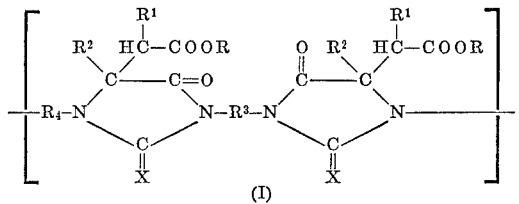

(I)

wherein R, $R^1$ and $R^2$, which may be the same or different each represent hydrogen or an optionally substituted alkyl or cycloalkyl radical, $R^3$ represents an optionally substituted alkylene, arylene, bis-(arylene)alkane or bivalent heterocyclic radical; $R^4$ represents an optionally substituted alkylene, arylene, bis-(arylene)alkane or bivalent heterocyclic radical and X represents oxygen or sulphur.

Only some of the products that can be produced in accordance with the invention comprise repeating units of Formula I above because this formula involves the bivalency of the radicals $R^3$ and $R^4$. It is possible, however, for the radicals attached to the nitrogen atoms of the hydantoin or thiohydantoin rings to be monovalent at least once in the polymeric molecule, thereby terminating the polymer chain or alternatively they may be trivalent or tetravalent, in which case hydantoin or thiohydantoin rings are attached to these valences. As a result, the molecules may be crosslinked either three-dimensionally or two-dimensionally.

In particular, the radicals R, $R^1$ and $R^2$ each represent hydrogen $C_1$–$C_{18}$ alkyl or $C_5$–$C_7$ cycloalkyl, $R^3$ represents a $C_1$–$C_{18}$ alkylene, phenylene, naphthylene, biphenylene, diphenylene ether, benzylene or bivalent heterocyclic radical and $R^4$ has the same meaning as $R^3$.

Heterocyclic radicals are preferably 5- or 6-membered rings containing one or more oxygen, nitrogen and/or sulphur atoms, for example radicals derived from furan, pyridine, thiophene, imidazole, pyrimidine or piperazine.

The alkyl, aryl and heterocyclic radicals referred to above and their counterpart bivalent radicals may also be substituted, for example by halogen such as Cl or Br, or by nitro groups, dialkylamino groups, alkoxy groups, aryloxy groups, alkyl radicals, carboalkoxy or carbamoyl groups.

In the most preferred embodiment of this invention, the radicals in the above described general formula have the following meaning: R is hydrogen, methyl and ethyl, $R^1$ and $R^2$ are each hydrogen or methyl, $R^3$ is a $C_4$–$C_{36}$ alkylene radical, a phenylene radical which may be substituted by halogen (chlorine) or alkyl (methyl), a naphthylene radical, a diphenylene alkane (diphenylene methane) radical, a diphenylene ether or a diphenylene sulfide, and $R^4$ is $C_2$–$C_{36}$ alkylene, $C_5$–$C_7$ cycloalkylene, phenylene, alkyl substituted phenylene, diphenylene alkane, diphenylene ether and diphenylene sulfide and X is oxygen.

These new polymeric polycarboxylic esters may be obtained by initially reacting a diester of an ethylene-1,2-dicarboxylic acid with a primary polyamine containing from 2 to 4 primary amino groups, optionally in admixture with a primary mono-amine, to form a succinic acid derivative which is then reacted with a polyisocyanate or polyisothiocyanate containing from 2 to 4 isocyanate or isothiocyanate groups, optionally in conjunction with a monoisocyanate or monoisothiocyanate, to form a urea or thiourea, and the resulting product is simultaneously or subsequently converted into a polycarboxylic acid ester containing hydantoin or thiohydantoin rings by ring closure in another reaction.

The method of preparation described above may be diagrammatically represented by the following equation in which the general radicals have the meaning defined earlier on:

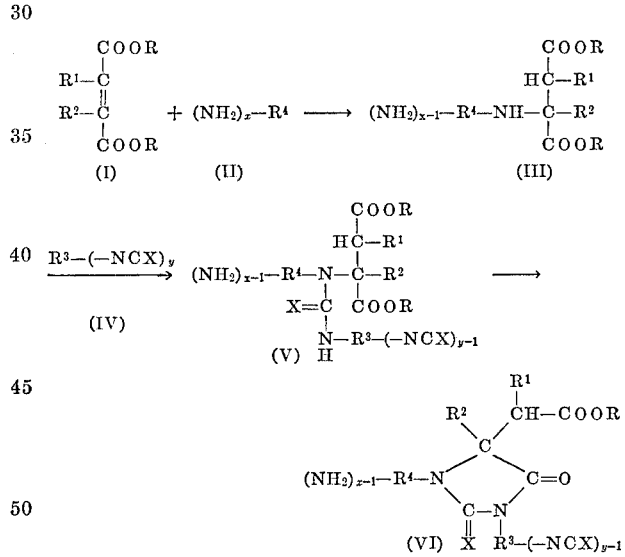

In the above formulae $x$ and $y$ represent integers from 1 to 4. In this connection, $x$ and $y$ must always be greater than 1 in at least some of the compounds II and IV used because otherwise no polymer could be formed. An identical reaction occurs at the $NH_2$- and NCX-groups left unchanged in the equation. This was omitted from the equation for the sake of simplicity. In either case, the products obtained are thus polymers. They are linear where $x$ and $y=2$ and branched when $x$ and/or $y$ is/are greater than 2 in at least some of the compounds.

Esters of maleic acid such as dimethyl, diethyl or dibutyl maleate and the corresponding fumaric acid esters are preferably used as esters of ethenylene-1,2-dicarboxylic acids (Formula I). They may be uesd in previously-prepared form or may even be prepared in situ from the corresponding alcohol (in excess) and maleic anhydride, especially since any excess alcohol present does not affect the subsequent addition of the primary amines and isocyanates or isothiocyanates. It is of course also possible to use other esters of maleic acid and polyhydric alcohols, such as ethylene glycol, glycerol or trimethylol propane, which esters are by no means difficult to prepare from the corresponding polyhydric alcohol and maleic anhydride in a preceding operation. Instead of the maleic acid esters, it is also possible to use corresponding representatives of substituted maleic acids in particular alkyl-substituted maleic acids such as methyl-, dimethyl-, ethyl- and butyl maleic acid. In each instance, it is also possible to use the corresponding fumaric acid esters.

Optionally substituted aliphatic, araliphatic, aromatic or heterocyclic amines with 2 to 4 primary amino groups may be used as the primary polyamines (Formula II). Examples are alkylene diamines such as ethylene diamine; 1,2- and 1,3-propylene diamine; 1,2-, 1,3- or 1,4-butylene diamine; hexamethylene diamine; decamethylene diamine; aliphatic or cycloaliphatic diamines obtained by condensing acetone with hydrocyanic acid, followed by hydrogenation; m and p-phenylene diamines and their alkyl derivatives, for example tolylene and dimethyl benzene diamines; and araliphatic diamines such as 1,3- and 1,4-xylylene diamine or α,3-diaminoethylbenzene. The polyvalent amines may also be substitution products of diphenylmethane, diphenylethane, diphenyl ether, diphenyl sulphone, benzene sulphonic acid phenyl ester, ethylene glycol dibenzoate, naphthalene or anthracene. Examples of suitable triamines include 4,4',4''-triaminotriphenyl phosphate or thiophosphate, 4,4',4''-triaminotriphenylmethane and 2,4,4' - triaminodiphenyl. Cycloaliphatic polyamines, for example cyclohexane-1,3- or -1,4-diamine, derived from the above-mentioned aromatic compounds may also be used.

Optionally substituted aliphatic, araliphatic or heterocyclic amines containing a primary amino group, may be used as primary mono-amines (Formula II) which may only be used in conjunctoin with primary polyamines or alternatively may be dispensed with altogether. The following are mentioned as examples: methylamine, ethylamine, propylamine, butylamine, octadecylamine, allylamine, benzylamine, aniline, toluidines, xylidines, aminopyridines and furfurylamine. The amines may also be substituted for example by OH groups or, particularly when the amines are aromatic, by halogen atoms or carboxylic ester groups, for example ethanolamine, propanolamine, 4-chlorobenzylamine, trichlorobenzylamine or aminocarboxylic acid esters may be used as substituted amines.

These primary monoamines are preferably used in quantities of up to 50 mol percent, based on the total number of amino groups present.

Addition of the amines is generally carried out at low temperatures, e.g., 20–100° C., to prevent aminolysis of the ester group still present in the molecule. If desired, a basic or acidic catalyst such as potassium carbonate, triethylamine, endoethylenepiperazine or glacial acetic acid, may be used. With less soluble reagents, the reaction is generally carried out in an organic solvent, for example an alcohol such as methanol or ethanol. In this case, the quantitative ratios should be such that stoichiometric quantities of α,β-unsaturated double bonds, i.e., ethenylene-1,2-dicarboxylic acid ester, and primary amino groups, are preferably used. The molar ratio of reactants should generally be from 1:2 to 2:1. The crude aminosuccinic acid esters thus obtained may be used as such without further purification, although aminosuccinic acid esters produced in any other convenient reaction may of course also be used for the following reaction with the di- or polyisocyanate or isothiocyanate.

Compounds containing at least two isocyanate groups in the molecule may be used as the di- or polyisocyanates or isothiocyanates (Formula IV) in the subsequent reaction with the resulting, generally crude, aminosuccinic acid esters. These isocyanate or isothiocyanate groups may be linked either aliphatically or aromatically. Examples of isocyanate components, such as these, include polymethylene diisocyanates, with from 4 to 12 methylene groups between the NCO-groups; m- and p-phenylene diisocyanate and alkyl derivatives thereof such as tolylene diisocyanate, ethylbenzenediisocyanates, propylbenzene diisocyanates and xylylene diisocyanates; and further-substituted derivatives of the aforementioned type such as 3,5,6-trichlorotolylene-2,4-diisocyanate or tetrachloro-m- and -p-phenyldiisocyanate.

The polyisocyanates or polyisothiocyanates may be based on diphenylmethane, diphenylethane, diphenyl ether, diphenyl sulphone, benzene sulphonic acid phenyl ester, ethylene glycol dibenzoate, naphthalene or anthracene nuclei. Examples of suitable triisocyanates include 4,4',4''-triisocyanatotriphenyl phosphate or thiophosphate, and 4,4',4''-triisocyanatotriphenylmethane. Accordingly, it is also possible, instead of the above-mentioned low-molecular-weight polysiocyanates, to use products with NCO-groups obtained from these compounds and less than chemically-equivalent quantities of a compound reacting polyfunctionally with respect to NCO-groups, for example a polyhydric alcohol or polyfunctional anhydride, or even polyisocyanates with isocyanurate rings obtained by trimerisation of the above-mentioned diisocyanates.

Instead of the above-mentioned isocyanates, the corresponding isothiocyanates may also be used.

Both aliphatic and aromatic isocyanates or isothiocyanates may be used as the mono-isocyanates or monoisothiocyanates which may only be used in conjunction with the polyisocyanates or polyisothiocyanates, but which may also be absent.

The following are mentioned as examples of isocyanate components of this kind: alkyl or alkenyl isocyanates having from 1 to 18 carbon atoms; aralkyl isocyanates such as benzyl or phenylethyl isocyanates; cycloalkyl isocyanates; aromatic isocyanates such as phenyl-, tolyl-, xylyl-, chlorophenyl-, di-, tri-, tetra- or pentachlorophenyl isocyanates, nitrophenyl- or alkoxyphenyl isocyanate, isocyanatobenzoic acid esters, isocyanatophthalic acid esters and naphthyl isocyanate; and heterocyclic isocyanates such as furyl isocyanate.

Instead of the above-mentioned isocyanates, the corresponding isothiocyanates may also be used.

These monoisocyanates or isothiocyanates are preferably used in quantities of up to 50 mol percent, based on the total number of isocyanate groups.

The reaction involving the aminosuccinic acid esters and the polyisocyanates or polyisothiocyanates is generally carried out in inert solvents, for example aliphatic or aromatic hydrocarbons and their halogenation products, esters, or ketones.

Due to its high velocity, the reaction may also be carried out in the presence of alcoholic or phenolic hydroxyl groups, i.e., groups of this kind may be present in the reaction components. Alternatively, excess alcohols may be used as solvent if a less than chemically equivalent amount of the isothiocyanate component, based on the amine component, is used. Generally speaking, the reaction is carried out by slowly adding the isocyanate component, optionally in an inert solvent, to the aminosuccinic acid ester previously introduced in a solvent, in accordance with the progress of the exothermic reaction. The quantitative ratios are preferably such that stoichiometric quantities of the NH- and NCX-groups are used. In this case, too, a stoichiometric ratio of from 1:2 to 2:1 should generally be observed. The temperature at which this reaction is carried out can be varied within wide limits. For example, temperatures in a range from 20 to 200° may be used.

The addition reaction results in the formation of primary urea or thiourea groups, some of which are converted through ring closure into corresponding hydantoin or thiohydantoin groups immediately after they have been formed. Cyclisation may be promoted by subsequent heating, optionally in the presence of other or additional higher-boiling solvents. In addition, cyclisation may also be accelerated by the addition of basic of acidic catalysts in the broadest sense. Reagents of suitable melting point may even be directly condensed in substance in the melt to form the polycarboxylic acid esters containing hydantoin or thiohydantoin rings. In this way, the required di- and polycarboxylic acid esters containing hydantoin or thiohydantoin rings are obtained in almost pure form. Analysis of the reaction products by infrared spectroscopy shows that possible or expected imide groups are not present during the reaction.

The resulting polymeric carboxylic acid esters containing hydantoin or thiohydantoin rings are polymeric compounds which generally have molecular weights in the range from 500 to 50,000. They may be converted by usual methods into other derivatives of the corresponding acids, for example into the free acids by hydrolysis, into the amides by reaction with amines, or into other esters by reaction with mono- or polyhydric alcohols.

The choice of the reagents determines the degree of polymerisation of the products. Further modification is possible by, for example, transesterification reactions or aminolysis of any ester group present, leading to the formation of crosslinked plastics if poly-functional alcohols or amines are used. Accordingly, the polymers contain additional ester or amide groups apart from the hydantoin or thiohydantoin rings. The products may be further modified by the incorporation of, for example, imidazole, benzimidazole, benzimide or pyromellitic acid imide rings.

The new polycarboxylic acid derivatives thus obtained may be used in particular for the production of plastics, particularly of plastics with an outstanding resistance to high temperatures coupled with a high degree of elasticity.

EXAMPLE 1

A mixture of 288 parts by weight of dimethyl maleate, 5 parts by weight of acetic acid and 100 parts by weight of benzene is heated to 80° C. 198 parts by weight of 4,4-diaminodiphenylmethane are then introduced in 4 portions over a period of 2 hours. The temperature is kept at 80° C. for 10 hours, and the reaction product is concentrated in vacuo at this temperature, as a result of which the corresponding aminosuccinic acid ester is obtained in almost quantitative yield.

97.3 parts by weight of the crude adduct thus obtained are then heated to 30° C. with 345 parts by weight of industrial cresol and 1 part by weight of endoethylene piperazine, followed by the introduction of 50 parts by weight of 4,4-diisocyanatodiphenylmethane. The product is left standing overnight, and is then heated for 4 hours at 200° C. 469 parts by weight of a solution of the particular polyhydantoin in cresol are obtained.

EXAMPLE 2

(a) 116 parts by weight of hexamethylene diamine are slowly added at 40° C. to 288 parts by weight of dimethylmaleate. The infrared spectrum of the reaction product thus obtained shows that it is almost quantitatively the addition product.

(b) 81 parts by weight of the aduct obtained in accordance with Example 2(a) are diluted with 306 parts by weight of industrial cresol, followed by the addition of 1 g. of N,N-dimethylbenzylamine. 50 parts by weight of 4,4'-diisocyanatodiphenylmethane are then added at 30° C. The temperature is kept at 30° C. for another hour, after which it is increased to 200° C. over a period of 4 hours. 424 parts by weight of a polyhydantoin solution in cresol are obtained. The solution has a viscosity of 1169 cp.$_{25}$ and, following application to a copper wire by the usual methods, produces an insulating lacquer with an outstanding resistance to high temperatures.

(c) A similar lacquer may be obtained from 81 parts by weight of adduct according to 2(a), 271 parts by weight of cresol and 34.8 parts by weight of a tolylene diisocyanate mixture containing the 2,4- and 2,6-isomers in a ratio of 80:20.

EXAMPLE 3

254 parts by weight of terephthalic acid-bis-glycol ester, 124 parts by weight of ethylene glycol and 98 parts by weight of maleic anhydride are initially esterified at 200° C./100 torr, cooled to 30° C. and diluted with 400 parts by weight of cresol. 58 parts by weight of hexamethylene diamine are added dropwise at 30° C. The temperature is kept at 30° C. for a period of 6 hours, after which 125 parts by weight of 4,4-diisocyanatodiphenylmethane are slowly introduced. The following day, condensation is completed by heating for 4 hours at 200° C. 1031 parts by weight of a polyhydantoin polyester are obtained. Following dilution with an equivalent quantity of cresol, it has a viscosity of 700 cp.$_{25}$ and may be used as described above for the production of electrical insulating lacquers.

EXAMPLE 4

(a) As described in Example 2(a), 114 parts by weight of hexahydro-p-phenylene diamine are first of all mixed with 288 parts by weight of dimethyl maleate. The product, obtained in a quantitative yield, did not show any amide bands in its infrared spectrum.

(b) Following dilution with 610 parts by weight of cresol, 161 parts by weight of the above adduct are reacted at 40° C. with 100 parts by weight of 4,4-diisocyanatodiphenylmethane condensation being completed over a period of 4 hours at 200° C. Yield=796 g., cp.$_{25}$=311 (1:1 in cresol).

(c) As in Example 4(b), 69.6 parts by weight of tolylene diisocyanate (2,4 - 2,6 - isomer ratio=80.20) are added to 161 parts by weight of the adduct according to Example 4(a) and 540 parts by weight of cresol. On completion of condensation, 696 parts by weight of polyhydantoin polyester cp.$_{25}$=152 (1:1 in cresol) are obtained.

EXAMPLE 5

162 parts by weight of the adduct according to Example 2(a) are diluted with 612 parts by weight of cresol. Following the addition of 1 part by weight of N,N-dimethylbenzylamine at 30° C., 100 parts by weight of 4,4-diisocyanatodiphenylmethane are introduced. The product is left standing for 3 days at room temperature, at the end of which 20 parts by weight of terephthalic acid-bis-glycol ester are added. This is followed by condensation or cyclisation for 4 hours at 200° C. Yield=795 parts by weight, cp.$_{25}$=1640.

10 parts by weight of 1,6-hexane diol may be used instead of terephthalic acid bis-glycol ester in a similar reaction. Yield=810 parts by weight, cp.$_{25}$=460.

EXAMPLE 6

174 parts by weight of tolylene diisocyanate (2,4:2,6-isomer ratio=80:20) are added dropwise at 30° C. to 404 parts by weight of the adduct obtained in accordance with Example 2(a) after it has been diluted with 1350 parts by weight of cresol. The following day, the product is heated for 4 hours at 200° C. 1880 parts by weight of polyhydantoin polyester are obtained. cp.$_{25}$=85 (1:1 in cresol).

EXAMPLE 7

(a) 144 parts by weight of dimethyl maleate are diluted with 50 parts by weight of methanol, and 57 parts by weight of hexahydro-p-phenylene diamine dissolved in 50 parts by weight of methanol are added dropwise at 20° C. The following day, the methanol is distilled off in vacuo at 20° C., the residue is diluted with 500 parts by weight of xylene and a solution of 125 parts by weight of 4,4-diisocyanatodiphenylmethane in 125 parts by weight of xylene is added dropwise to it at a maximum temperature of 30° C. The product is then heated at 130° C. over a period of 6 hours, 283 parts by weight of the polyhydantoin polyester being obtained by suction filtration (63.6% C, 5.9% H, 9.4% N).

(b) 81 parts by weight of the adduct obtained in ac- are then transesterified and condensed with 248 parts by weight of ethylene glycol at a temperature of up to 170° C. The polyester thus obtained containing hydantoin groups may be used for the production of polyurethane plastics, or may be condensed purely thermally to form a polymer.

Similar polyhydantoin polyesters can be obtained as described above by using a stoichiometric quantity of 1-amino-3-aminomethyl-3,5,5-trimethylcyclohexane instead of the amine, or tolylene diisocyanate as the isocyanate.

EXAMPLE 8

(a) A mixture of 47 parts by weight of aniline and 54 parts by weight of m-phenylene diamine is added dropwise at 20° C. to a mixture of 144 parts by weight of dimethyl maleate and 2 g. of endoethylene piperazine in 100 parts by weight of methanol. The product is stirred for 4 hours at room temperature, the methanol is distilled off in vacuo and 500 parts by weight of xylene are added. 84 parts by weight of hexamethylene diamine are then added dropwise. After heating for 6 hours at 130° C., 269 parts by weight of a resin-like polyhydantoin polyester containing 66.5% C, 6.4% H, and 12.1% N are obtained after appropriate working up.

(b) 140 parts by weight of this polyester are then condensed with 248 parts by weight of ethylene glycol at 170° C. initially at normal pressure and then in vacuo. The resulting polyester is taken up in cresol. The cresol solution may be used for the production of electrical insulating lacquers.

What is claimed is:

1. A process for the production of polymeric polycarboxylic acid esters containing hydantoin or thiohydantoin rings which comprises reacting a diester of an ethylene 1,2-dicarboxylic acid with a primary polyamine containing from 2 to 4 amino groups to form the corresponding succinic acid derivative by addition of amino to the double bond of the ester, reacting said derivative with a polyisocyanate or polyisothiocyanate containing from 2 to 4 isocyanate or isothiocyanate groups to form a urea or thiourea and subsequently or simultaneously subjecting said urea or thiourea to a ring closure reaction.

2. The process of claim 1 wherein up to 50% of the amino groups are furnished by an additionally used primary monoamine.

3. The process of claim 1 wherein up to 50% of the isocyanate or isothiocyanate groups taking part in the reaction are furnished by an additionally used monoisocyanate or monoisothiocyanate.

4. The process of claim 1 wherein a dialkylester of an ethylene-1,2-dicarboxylic acid is reacted in an inert organic solvent at a temperature of from about 20 to 100° C. with a mixture of primary amines, at most 50% of the amino groups being provided by a primary monoamine and the remainder by primary di-, tri- or tetramines wherein the molar ratio of diester to amines, based on amino groups, is 1:2 to 2:1, further reacting the resulting amino succinic acid compound at a temperature of from 20 to 200° C. in an inert solvent with a mixture of isocyanates or isothiocyanates, at most 50% of the isocyanate or thioisocyanate groups being provided by a monoisocyanate or monoisothiocyanate and the remainder by di-, tri-, isocyanates or di-, tri- or tetraisocyanates in a molar ratio of —NH to isocyanate or thioisocyanate groups of 1:2 to 2:1 to form a urea or thiourea compound and subjecting this compound to ring closure by raising the temperature.

5. The process of claim 1 which comprises reacting a di-lower alkyl ester of an ethenylene-1,2-dicarboxylic acid in an inert solvent and a temperature of 20 to 100° C. with a primary diamine selected from $C_2$ to $C_{10}$-alkylene diamines and $C_5$ to $C_6$-cycloalkylene diamines in a molar ratio of diester to primary diamine, based on amino groups, of from 1:2 to 2:1 to form said succinic acid derivative, reacting said derivative in an inert solvent and at a temperature of between 20 and 200° C. with a diisocyanate or diisothiocyanate selected from $C_4$ to $C_{12}$ polymethylene diisocyanates, m- and p-phenylene diisocyanates, their lower alkyl derivatives and the corresponding analogous thioisocyanates in a molar ratio of —NH to isocyanate or thioisocyanate groups of 1:2 to 2:1 and subjecting the resulting urea or thiourea compound to a ring closure reaction by raising its temperature.

6. A polymer of a molecular weight between 500 and 50,000 which comprises repeating structural units of the formula

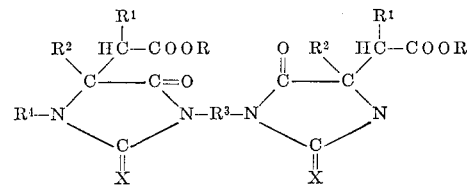

wherein R, $R^1$ and $R^2$, which may be the same or different, are each hydrogen, alkyl or cycloalkyl or substituted alkyl wherein the substituent is chloro, bromo, nitro, dialkylamino, alkoxy, aryloxy, carboalkoxy or carbamoyl; $R^3$ and $R^4$, which may be same or different, are each bivalent alkylene, arylene, bis-(arylene)alkane, heterocyclic or one of said radicals substituted by chloro, bromo, nitro, dialkylamino, alkoxy, aryloxy, carboalkoxy or carbamoyl and X is oxygen or sulphur.

7. A polymer of claim 6 wherein R, $R^1$ and $R^2$ are each hydrogen, $C_1$ to $C_{18}$ alkyl or $C_5$ to $C_7$ cycloalkyl and $R^3$ and $R^4$ are each $C_1$ to $C_{18}$ alkylene, phenylene, naphthylene, biphenylene, diphenylene ether, benzylene or bivalent heterocyclic which contains 5 to 6 ring members and oxygen, nitrogen or sulfur as hetero atoms.

8. A polymer of claim 6 wherein R is hydrogen, methyl or ethyl; $R^1$ and $R^2$ are each hydrogen or methyl; $R^3$ is $C_4$–$C_{36}$ alkylene, phenylene, halogen substituted phenylene, alkyl substituted phenylene, naphthylene, diphenylene methane, diphenylene ether or diphenylene sulfide; $R^4$ is $C_2$–$C_{36}$ alkylene, $C_5$–$C_7$ cycloalkylene, phenylene alkyl substituted phenylene, diphenylene alkane, diphenylene ether or diphenylene sulfide and X is oxygen.

9. The polymer of claim 6 having the recurring structural unit

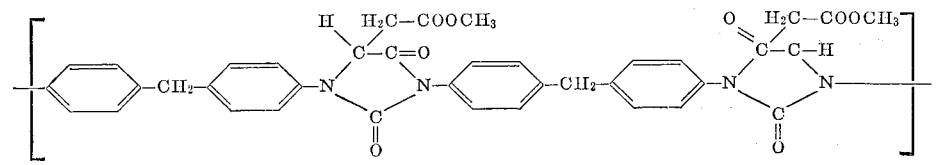

10. The polymer of claim 6 having the recurring structural unit
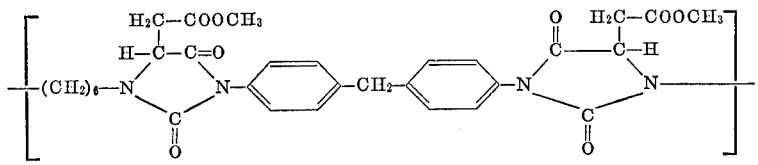
11. The polymer of claim 6 having the recurring structural unit
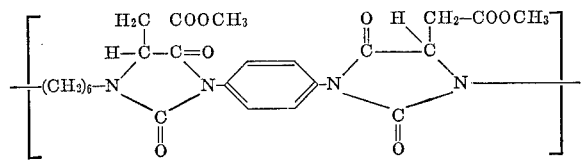
References Cited
UNITED STATES PATENTS
3,296,208   1/1967   Rogers _____ 260—67.5
OTHER REFERENCES
Chemical Abstracts, vol. 56, 1962, pp. 89N and 91N.
DONALD E. CZAJA, Primary Examiner
M. J. WELSH, Assistant Examiner
U.S. Cl. X.R.
117—128.4; 260—33.4, 33.6, 75